United States Patent
Joudon et al.

(10) Patent No.: US 11,199,094 B2
(45) Date of Patent: Dec. 14, 2021

(54) TURBINE ENGINE BLADE INCLUDING STRUCTURAL REINFORCEMENT ADHESIVELY BONDED USING AN ADHESIVE BOND OF INCREASED TOUGHNESS

(71) Applicant: SAFRAN AIRCRAFT ENGINES, Paris (FR)

(72) Inventors: Vincent Joudon, Moissy-Cramayel (FR); Franck Bernard Léon Varin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 284 days.

(21) Appl. No.: 16/520,489

(22) Filed: Jul. 24, 2019

(65) Prior Publication Data

US 2020/0102834 A1    Apr. 2, 2020

(30) Foreign Application Priority Data

Jul. 24, 2018  (FR) ...................................... 1856862

(51) Int. Cl.
*F01D 5/28*  (2006.01)
*F01D 5/14*  (2006.01)

(52) U.S. Cl.
CPC ............. *F01D 5/141* (2013.01); *F01D 5/147* (2013.01); *F01D 5/282* (2013.01);
(Continued)

(58) Field of Classification Search
CPC .......... F01D 5/141; F01D 5/147; F01D 5/282; F04D 29/388
(Continued)

(56) References Cited

U.S. PATENT DOCUMENTS

| 5,876,651 A * | 3/1999 | Blackburn, Jr. ........ B32B 15/08 264/265 |
| 8,309,477 B2 * | 11/2012 | Northfield ................. B32B 5/08 442/228 |

(Continued)

FOREIGN PATENT DOCUMENTS

| EP | 2 033 772 A1 | 3/2009 |
| FR | 2 961 866 A1 | 12/2011 |

OTHER PUBLICATIONS

Search Report as issued in French Patent Application No. 1856862, dated Mar. 15, 2019.

*Primary Examiner* — Michael L Sehn
(74) *Attorney, Agent, or Firm* — Pillsbury Winthrop Shaw Pittman LLP

(57) ABSTRACT

A turbine machine blade has an aerodynamic surface that is made of organic matrix composite material reinforced by fibers and metal structural reinforcement that is adhesively bonded by an epoxy adhesive bond on the leading edge, which is of matching shape, and that presents along its entire height a section that is substantially V-shaped with a base extended by two lateral flanks of respective profiles that become thinner at free ends going towards the trailing edge. In order to increase the toughness of the epoxy adhesive bond in the event of the epoxy adhesive bond cracking, the epoxy adhesive bond includes a reinforcing sheet of elastomeric polymer enabling the reinforcing sheet to be torn into two portions, the elastomeric polymer having the following properties at 23° C.: Young's modulus E≈10 MPa; stress at rupture $\sigma_r$>10 MPa; strain at rupture $\varepsilon_r$>80%.

6 Claims, 3 Drawing Sheets

(52) U.S. Cl.
CPC ...... *F05D 2220/30* (2013.01); *F05D 2230/00* (2013.01); *F05D 2300/603* (2013.01)

(58) Field of Classification Search
USPC ........................................................ 416/224
See application file for complete search history.

(56) References Cited

U.S. PATENT DOCUMENTS

| | | | |
|---|---|---|---|
| 9,664,201 B2* | 5/2017 | Dudon .................... | C23C 24/04 |
| 2014/0030105 A1* | 1/2014 | Fameau ................ | F04D 29/023 |
| | | | 416/229 A |
| 2016/0201482 A1* | 7/2016 | Parkos, Jr. .............. | F01D 5/286 |
| | | | 416/224 |
| 2017/0023010 A1* | 1/2017 | Drozdenko .............. | B32B 7/12 |

\* cited by examiner

TURBINE ENGINE BLADE INCLUDING STRUCTURAL REINFORCEMENT ADHESIVELY BONDED USING AN ADHESIVE BOND OF INCREASED TOUGHNESS

CROSS-REFERENCE TO RELATED APPLICATIONS

This application claims priority to French Patent Application No. 1856862, filed on Jul. 24, 2018, the entire content of which is incorporated herein by reference in its entirety.

FIELD

The field of the invention is that of turbine engines, and more particularly that of fan blades made of organic matrix composite material reinforced by fibers and in which the leading edge includes metal structural reinforcement; and the present invention relates more particularly to a method of fastening the metal structural reinforcement onto the composite material airfoil of the blade.

BACKGROUND

It should be recalled that the leading edge corresponds to the front portion of an aerodynamic profile that faces the air stream and that divides the air flow into a pressure side air flow and a suction side air flow. In contrast, the trailing edge corresponds to the rear portion of an aerodynamic profile where the pressure side and suction side flows reunite.

Thus, FIG. 1 is a side view of a blade, e.g. a fan blade of a turbine engine (not shown), that includes metal structural reinforcement on its leading edge.

The blade 10 comprises an aerodynamic surface or airfoil 12 secured to a root 14 extending in an axial first direction 16 between a leading edge 18 and a trailing edge 20, and in a radial second direction 22 that is substantially perpendicular to the first direction 16 between the root 14 and a tip 24 of the blade. The side faces of the airfoil 12 that connect the leading edge 18 to the trailing edge 20 constitute the suction side face 26 and the pressure side face 28 of the blade.

Conventionally, the airfoil 12 is made of organic matrix composite material that is reinforced by fibers. By way of example, the composite material used may be made up of a woven assembly of carbon fibers and a matrix of epoxy resin, which are shaped together by molding using a resin injection method of the resin transfer molding (RTM) type.

Turbine engine blades, and in particular fan blades, are subjected to high levels of stress, in particular of mechanical stress. Thus, it is known to fit fan blades made of composite material with structural reinforcement that extends along the full height of the aerodynamic profile, and that matches the shape of the leading edge, as described in application EP 1 908 919 filed in the name of the Applicant. Such structural reinforcement serves to protect the composite material blade in the event of the fan being impacted by a foreign body, e.g. such as a bird, hail, or indeed stones during takeoff or landing. The reinforcement is a piece of metal made of titanium alloy, preferably of TA6V type, that is made using a preform obtained from a simple bar of metal and by a succession of forging steps, as described in particular in application FR 2 961 866, likewise filed in the name of the Applicant.

As shown in FIG. 2, the structural reinforcement 30 fits closely to the shape of the leading edge 18 of the airfoil 12 of the blade 10, it extends that edge so as to form the leading edge of the blade 32, and it is bonded in place using an epoxy adhesive bond having the following properties at 23° C.: Young's modulus 1 gigapascal (GPa)<E<5 GPa; stress at failure $\sigma_r$>10 megapascals (MPa); strain at failure $\varepsilon_r$<10%.

Returning to FIG. 1, it can be seen that the reinforcement extends both in the first direction 16 beyond the leading edge and in the second direction 22 between the root 14 and the tip 24 of the blade.

In conventional manner, the structural reinforcement is beneficially a single piece having a section that is substantially V-shaped, presenting a face or nose 34 of outside profile forming the leading edge of the blade 32 and of rounded inside profile suitable for fitting on the rounded shape of the leading edge 18 of the airfoil 12. The base is extended by two lateral flanks or fins 36A and 36B that fit closely to the pressure side 26 and to the suction side 28 of the blade, and that present respective profiles that taper or thin down towards the free ends 38A and 38B going towards the trailing edge of the blade.

As shown in the detail of FIG. 2A, the bond or film of epoxy adhesive 40 also contains a nylon support 42 integrated in the film of raw adhesive and serving to calibrate the thickness of the bond during polymerization, when the viscosity of the epoxy becomes temporarily very low. The assembly made up in this way out of epoxy adhesive and out of a thermoplastic polymer constituted by nylon presents great capacity for absorbing energy resulting from a variety of shocks and impacts.

Nevertheless, such impacts correspond to mechanical loads on the blade and, by edge effects, they give rise to stress concentrations in the adhesive situated under the ends of the metal structural reinforcement, thereby facilitating the initiation of cracking, which then propagates more widely under the metal structural reinforcement. Furthermore, the presence of the nylon support 42 has a considerable influence on the propagation of such cracking in the adhesive bond 40. Specifically, and as shown in FIG. 3, because of poor adhesion between nylon and epoxy, the propagation of the crack is facilitated by alternating phases of propagation in the epoxy adhesive and phases of propagation at the epoxy/nylon interface, thereby systematically uncovering the nylon support along the interface after the crack has propagated.

This cracking can also continue to propagate in the event of other impacts or as a result of vibratory fatigue loading, thereby risking delamination, fiber rupture, or damage by loss of cohesion between the fiber and the matrix.

The fan blade as damaged in this way then needs to be repaired or replaced during a maintenance operation, thereby having a considerable impact on the availability of the aircraft that includes the turbine engine in question.

SUMMARY

In this context, an aspect of the invention seeks to mitigate the above-mentioned drawbacks of present-day adhesively bonded structural reinforcements by proposing a turbine machine blade including metal structural reinforcement for which adhesive cracking is suitably reduced in the event of a foreign body impacting against the fan.

This aspect is achieved by a turbine machine blade having an aerodynamic surface extending along a first direction between a leading edge and a trailing edge, and along a second direction that is substantially perpendicular to the first direction between a blade root and a blade tip, the aerodynamic surface being made of organic matrix composite material reinforced by fibers and of metal structural reinforcement that is adhesively bonded by an epoxy adhesive bond on the leading edge, which is of matching shape, and that presents along its entire height a section that is substantially V-shaped, with a base extended by two lateral flanks of respective profiles that become thinner at free ends going towards the trailing edge, the blade being characterized in that, in order to increase the toughness of the epoxy adhesive bond in the event of the epoxy adhesive bond cracking, the epoxy adhesive bond includes a reinforcing sheet of elastomeric polymer enabling the reinforcing sheet to be torn into two portions, the elastomeric polymer having the following properties at 23° C.: Young's modulus $E \approx 10$ MPa; stress at rupture $\sigma_r > 10$ MPa; strain at rupture $\varepsilon_r > 80\%$.

In the realm of manufacturing a mechanical system, one skilled in the art would understand that the terms "substantially perpendicular" and "substantially V-shaped" allow for slight deviations due to the manufacturing process. For example, one skilled in the art would understand that prefacing the term "perpendicular" with "substantially" allows for the coverage of those configurations in which the first and second directions depart from a strict perpendicular configuration, but remain approximately perpendicular due to the manufacturing process.

Thus, adding a reinforcing sheet made of an elastomeric polymer, thereby increasing the toughness of the adhesive bond, serves to avoid the cracking that is observed in prior art solutions.

In an embodiment, the elastomeric polymer reinforcing sheet has a cracking rate per unit area $\gamma$ of about 0.02 so as to double the critical energy release rate $G_C$ of the adhesive bond as defined by the following formula:

$$G_C = \alpha \int_{epoxy} \sigma(\delta) d\delta + \gamma \int_{elastomer} \sigma(\delta) d\delta$$

where $\alpha$ is the cracking rate per unit area in the epoxy resin and $\delta$ represents the opening of the lips of the crack and $\sigma$ represents the associated cohesion stress.

In the embodiment under consideration, the elastomeric polymer reinforcing sheet is constituted by latticework made up of a plane array of square and/or rectangular meshes or of circular meshes. This reinforcing sheet may be embedded completely in the adhesive bond, or it may merely be integrated on an outside face of the adhesive bond.

Another aspect of the invention also provides any turbine engine including at least one such blade.

BRIEF DESCRIPTION OF THE DRAWINGS

Other characteristics and benefits of the present invention appear from the following description given with reference to the accompanying drawings which an embodiment having no limiting character, and in which.

DETAILED DESCRIPTION

Figure 1:
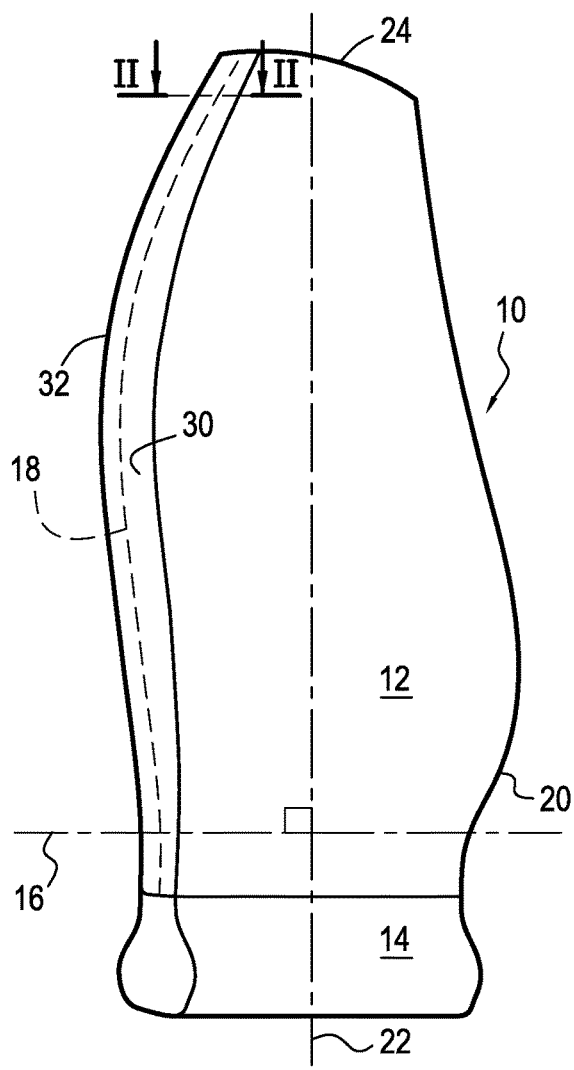
FIG. 1 shows a side view of a turbine engine fan blade.
Figure 2:
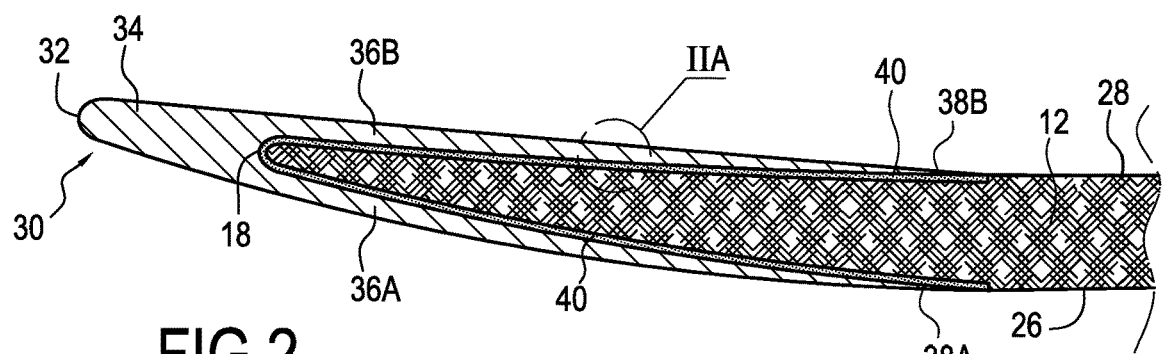
FIG. 2 is a fragmentary section of the FIG. 1 blade showing metal structural reinforcement for the leading edge adhesively bonded on the composite material blade.
Figure 2A:
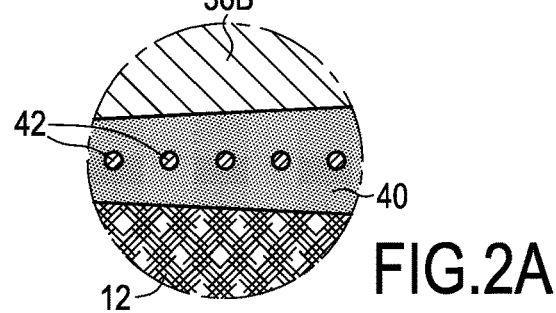
FIG. 2A shows a detail of the adhesive bond between the structural reinforcement and the composite material blade.
Figure 3:
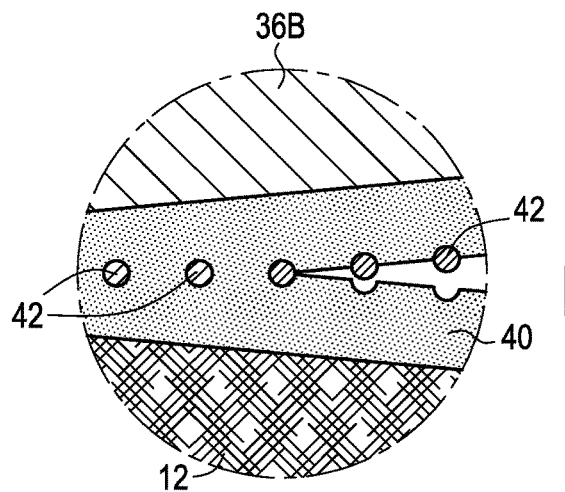
FIG. 3 shows crack propagation in a known adhesive bond including a nylon support.
Figure 4:
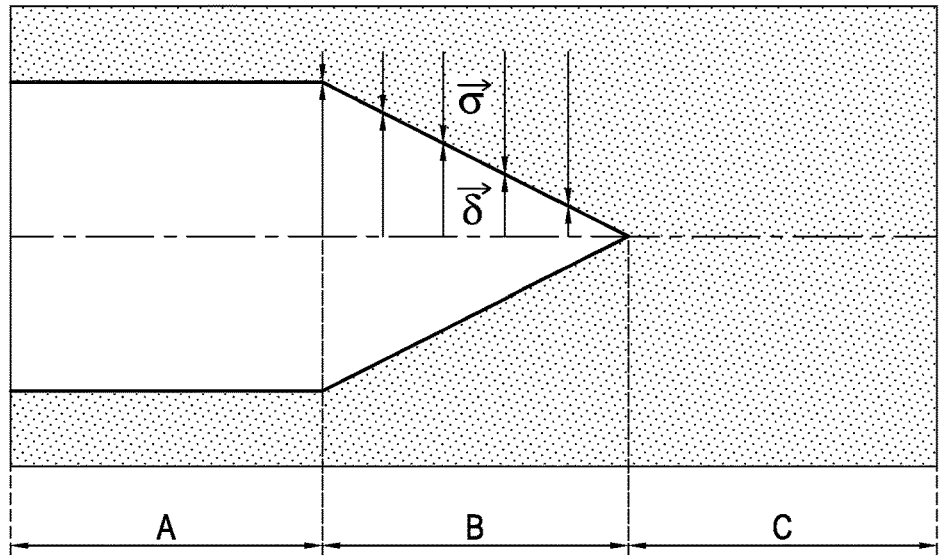
FIG. 4 shows a theoretical model for crack propagation from the free edge of healthy material.

FIG. 4 is a graphical illustration of a theoretical model enabling the present invention to be achieved.

Specifically, the technical solution proposed by the inventors for reducing cracking in the adhesive bond between metal protection and the leading edge of a composite material fan blade is to increase the toughness of the polymerized adhesive bond. Specifically, toughness is the ability of a material to withstand crack initiation or propagation. It may be quantified by the critical energy release rate $G_C$ that represents the energy needed to propagate a crack of unit area through a healthy material C from its free edge A and via its intermediate cohesive zone B. This rate is expressed as a function of the opening $\delta$ between the lips of the crack and of the associated cohesion stress $\sigma$:

$$G_C = \int \sigma(\delta) d\delta$$

Consequently, it is desirable to act on the cohesion relationship $\sigma(\delta)$ that controls the opening of a crack in order to increase the critical energy release rate $G_C$ and thus the toughness of a material. This is the principle used by the present invention.

In the prior art adhesive bond including a nylon support, $G_C$ may be expressed as the sum of the energy dissipated by the crack propagating in the epoxy plus the energy dissipated by the crack propagating at the nylon/epoxy interface:

$$G_C = \alpha \int_{epoxy} \sigma(\delta) d\delta + \beta \int_{nylon/epoxy} \sigma(\delta) d\delta$$

where $\alpha$ is the cracking rate per unit area in epoxy and $\beta$ is the cracking rate per unit area at the nylon/epoxy interface. This scenario has been validated by analyzing the appearance of ruptures, which show that the nylon support is systematically uncovered after the crack has propagated, as explained in the introduction. This indicates the presence of low adhesion between nylon and epoxy, thereby facilitating crack propagation along that interface. It may also be observed that the person skilled in the art takes advantage of this feature by conventionally using nylon tear fabrics for texturing the surfaces of epoxy matrix composite materials. The energy dissipated during this propagation stage is relatively low since it does not involve high stress nor does it involve large strain in the material. For a nylon support, it can thus be estimated that the energy dissipated by cracking in the epoxy resin contributes to the majority of the critical energy release rate $G_C$ of the adhesive bond:

$$G_C = \alpha \int_{epoxy} \sigma(\delta) d\delta$$

The proposed technical solution thus consists in replacing the nylon support with an elastomer reinforcing sheet (properties at 23° C.: Young's modulus $E \approx 10$ MPa; stress at failure $\sigma_r > 10$ MPa; strain at failure $\varepsilon_r > 80\%$) so as to replace a low energy propagation stage at the epoxy/nylon interface with a higher energy propagation stage in the elastomer element. An example of such an elastomer element is known under the reference 23HP90 from the supplier ITC.

Figure 5:
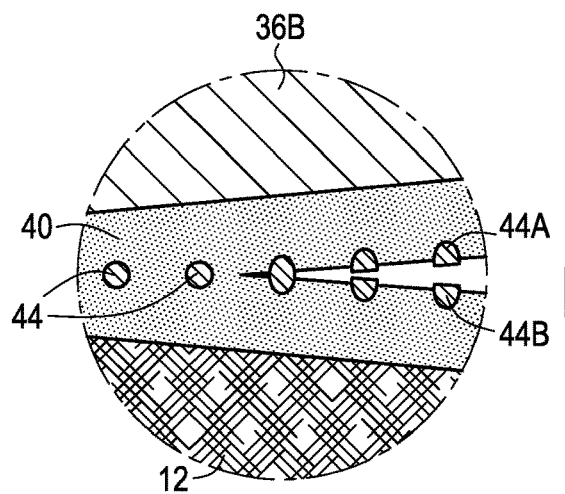
FIG. 5 shows crack propagation in an adhesively bonded structure in accordance with an embodiment of the invention.

Specifically, the low Young's modulus of elastomer causes it to deform during opening of the lips of the crack. The deformation of the elastomer may become very large and involves non-negligible stresses as it advances towards rupture of the reinforcing sheet. Under such circumstances, the elastomer reinforcing sheet 44 tears into two separate portions 44A and 44B and creates "bridges" between the lips of the crack, as shown in FIG. 5. The energy dissipated by the process of deforming and cracking the elastomer reinforcing sheet contributes greatly to increasing the critical energy release rate $G_C$ of the adhesive bond:

$$G_C = \alpha \int_{epoxy} \sigma(\delta) d\delta + \gamma \int_{elastomer} \sigma(\delta) d\delta$$

with:

$\int_{elastomer} \sigma(\delta) d\delta \approx 10{,}000$ joules per square meter (J/m²) (for natural rubber)$\gg \int_{epoxy} \sigma(\delta) d\delta \approx 200$ J/m² (for a standard epoxy)

Where $\alpha$ is the cracking rate per unit area in the epoxy resin and $\gamma$ is the cracking rate per unit area in the elastomer reinforcing sheet. By way of example, a beneficial value for $\gamma$ is 0.02, thereby doubling $G_C$ and retaining all of the benefit of epoxies in terms of stiffness.

Figure 6A:
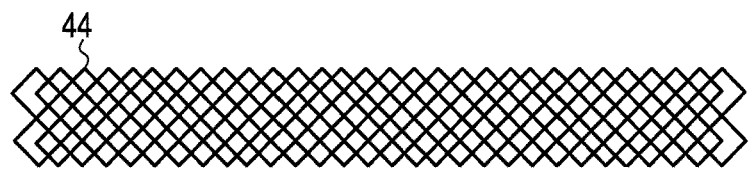
FIGS. 6A and 6B show two examples of reinforcing sheets that are to be incorporated in the adhesively bonded structure of FIG. 5.
Figure 6B:
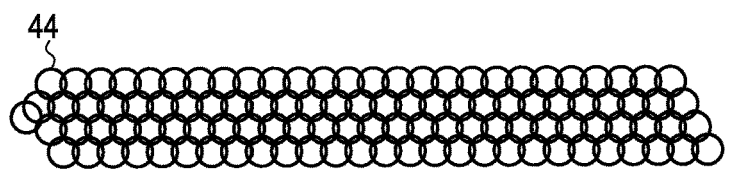

The reinforcing sheet may present various shapes, with two examples being shown in plan view in FIGS. 6A and 6B. FIG. 6A shows a latticework made up of an array of square and/or rectangular meshes, and FIG. 6B shows latticework made up of a plane array having circular meshes, like chain-mail.

Figure 7A:
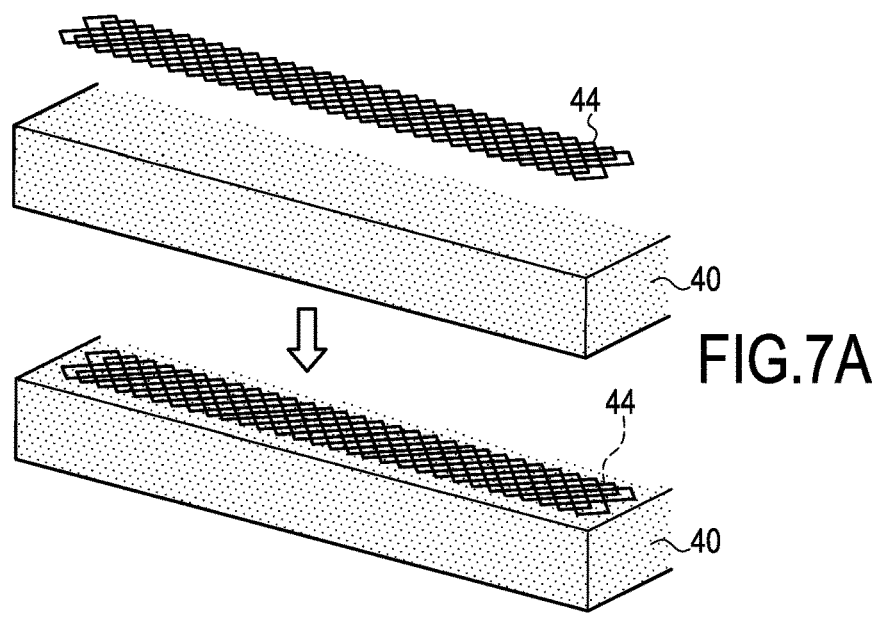
FIGS. 7A and 7B show two examples of a method enabling the reinforcing sheets of FIG. 6A or 6B to be put into place in an adhesive bond in accordance with embodiments of the invention.
Figure 7B:
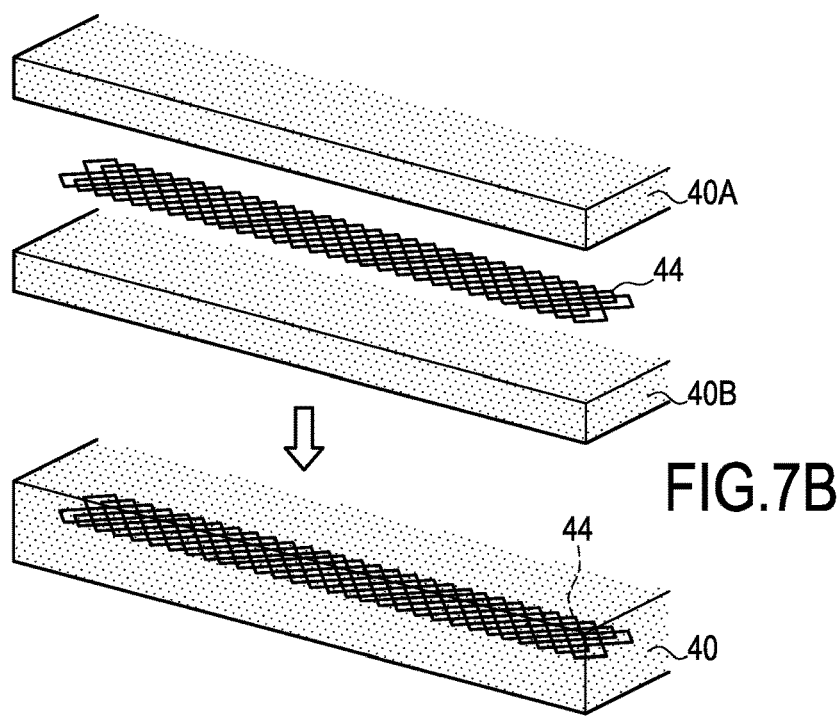

The reinforcing sheet 44 may be incorporated in the adhesive bond 40 using two distinct methods, that may be referred to as single impregnation or double impregnation. In the single impregnation method, shown in FIG. 7A, the elastomer reinforcing sheet 44 is integrated solely at the surface on an outside face of the raw epoxy adhesive bond, whereas in the double impregnation method, as shown in FIG. 7B, the elastomer reinforcing sheet is deposited between two films 40A and 40B of raw epoxy adhesive and, after polymerization, it is completely "embedded" in the adhesive bond. In known manner, this polymerization is obtained in specific conventional tooling, e.g. at a temperature of 180° C. and a pressure of 3 bars for 60 minutes.

Thus, an embodiment of the present invention, which consists in integrating an elastomer reinforcing sheet in a film of raw adhesive in order to increase the toughness of the bond after polymerization, and as a replacement for a nylon support having the sole function of calibrating the thickness of the bond, makes it possible, in comparison with the state of the art, to benefit in particular from the following advantages:
  controlling the distribution and the position of the elastomer in the film of adhesive, in particular by working on the shape of the reinforcing sheet;
  working with any film of raw adhesive, including a film of adhesive that already contains elastomer fillers;
  continuing to perform a thickness calibration function for the polymerized adhesive bond; and
  limiting uptake of moisture (problematic for aging) which is a known drawback of a nylon support.

Although the above description is illustrated by means of a turbine engine fan blade, it should be observed that the invention is also applicable to making metal structural reinforcement for reinforcing a leading edge of any type of turbine engine blade, whether for terrestrial or aviation use, and in particular a helicopter turboshaft engine or an airplane turbojet, and also for propellers such as unducted contrarotating double fan propellers.

The invention claimed is:

1. A turbine machine blade having an aerodynamic surface extending along a first direction between a leading edge and a trailing edge, and along a second direction that is substantially perpendicular to said first direction between a blade root and a blade tip, said aerodynamic surface being made of organic matrix composite material reinforced by fibers, the blade also including metal structural reinforcement that is adhesively bonded by an epoxy adhesive bond on said leading edge, which is of matching shape, and that presents along its entire height a section that is substantially V-shaped with a base extended by two lateral flanks of respective profiles that become thinner at free ends going towards said trailing edge, wherein, in order to increase the toughness of the epoxy adhesive bond in the event of the epoxy adhesive bond cracking, said epoxy adhesive bond includes a reinforcing sheet consisting of elastomeric polymer enabling the reinforcing sheet to be torn into two portions, said elastomeric polymer having the following properties at 23° C.: Young's modulus E≈10 MPa; stress at rupture $\sigma_r$>10 MPa; strain at rupture $\varepsilon_r$>80%, wherein said elastomeric polymer reinforcing sheet is constituted by latticework made up of a plane array of square and/or rectangular meshes or of circular meshes.

2. The blade according to claim 1, wherein said elastomeric polymer reinforcing sheet has a cracking rate per unit area $\gamma$ of about 0.02 so as to double the critical energy release rate $G_C$ of said adhesive bond as defined by the following formula:

$$G_C = \alpha \int_{epoxy} \sigma(\delta) d\delta + \gamma \int_{elastomer} \sigma(\delta) d\delta$$

where $\alpha$ is the cracking rate per unit area in the epoxy resin and $\delta$ represents the opening of the lips of the crack and $\sigma$ represents the associated cohesion stress.

3. The blade according to claim 1, wherein said elastomeric polymer reinforcing sheet is completely embedded in said adhesive bond.

4. The blade according to claim 1, wherein said elastomeric polymer reinforcing sheet is integrated on an outside face of said adhesive bond.

5. The blade according to claim 1, constituting a turbine engine fan blade.

6. A turbine engine including at least one blade according to claim 5.

* * * * *